(12) United States Patent
Chiba

(10) Patent No.: US 11,070,686 B2
(45) Date of Patent: Jul. 20, 2021

(54) IMAGE PROCESSING APPARATUS, CONTROL METHOD OF IMAGE PROCESSING APPARATUS, AND RECORDING MEDIUM

(71) Applicant: CANON KABUSHIKI KAISHA, Tokyo (JP)

(72) Inventor: Shinichi Chiba, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/547,923

(22) Filed: Aug. 22, 2019

(65) Prior Publication Data

US 2020/0076970 A1  Mar. 5, 2020

(30) Foreign Application Priority Data

Aug. 31, 2018  (JP) .............................. JP2018-163035

(51) Int. Cl.
*H04N 1/00* (2006.01)
*G06F 3/12* (2006.01)

(52) U.S. Cl.
CPC ....... *H04N 1/00411* (2013.01); *G06F 3/1273* (2013.01); *H04N 1/00389* (2013.01); *H04N 1/00395* (2013.01); *H04N 1/00482* (2013.01); *H04N 1/00517* (2013.01); *H04N 1/00474* (2013.01)

(58) Field of Classification Search
CPC .......... H04N 1/00389; H04N 1/00395; H04N 1/00411; H04N 1/00474; H04N 1/00482; H04N 1/00506; H04N 1/00517; H04N 1/21; H04N 2201/0094; H04N 2201/00949; G06F 3/1222; G06F 3/1204; G06F 3/1257; G06F 3/1273
USPC ................................................ 358/1.11–1.18
See application file for complete search history.

(56) References Cited

U.S. PATENT DOCUMENTS 9,936,088 B2    4/2018   Yoshida
10,198,226 B2   2/2019   Chiba
2008/0144087 A1*  6/2008  Mitsui .................. G06F 3/1204
                                                            358/1.15

(Continued)

FOREIGN PATENT DOCUMENTS

JP    2010-201931 A    9/2010
JP    2015-146503 A    8/2015

*Primary Examiner* — Chad Dickerson
(74) *Attorney, Agent, or Firm* — Venable LLP

(57) ABSTRACT

An image processing apparatus displays an operation screen for a user's operation-input in order to select a predetermined process from among a plurality of processes, displays a selection screen for selecting a document to be printed, in a case in which a first button is selected from the operation screen, and displays a setting screen for accepting a print setting for a selected first document. Printing is performed in accordance with the first print setting accepted by the setting screen, and information including at least information indicating the first print setting and information indicating the first document as history information is stored. In addition, a second button corresponding to the history information on the operation screen is displayed, and the first print setting and the first document for printing the first document with the first print setting is read out, in a case the second button is selected.

16 Claims, 14 Drawing Sheets

(56) References Cited

U.S. PATENT DOCUMENTS

| | | | |
|---|---|---|---|
| 2009/0219562 A1* | 9/2009 | Hasegawa | H04N 1/00472 358/1.15 |
| 2011/0007338 A1* | 1/2011 | Kawanishi | G06F 3/1286 358/1.14 |
| 2014/0198343 A1* | 7/2014 | Cho | H04N 1/00482 358/1.15 |
| 2015/0026118 A1* | 1/2015 | Ikejima | G06F 16/176 707/608 |
| 2015/0153983 A1* | 6/2015 | Hayashi | G06F 3/1204 358/1.15 |
| 2015/0264206 A1* | 9/2015 | Maeda | H04N 1/00506 358/1.13 |
| 2016/0364183 A1* | 12/2016 | Saito | G06F 3/1274 |
| 2018/0191920 A1 | 7/2018 | Yoshida | |
| 2018/0217797 A1* | 8/2018 | Inoue | H04N 1/00474 |
| 2018/0220015 A1* | 8/2018 | Akuzawa | H04N 1/00517 |

* cited by examiner

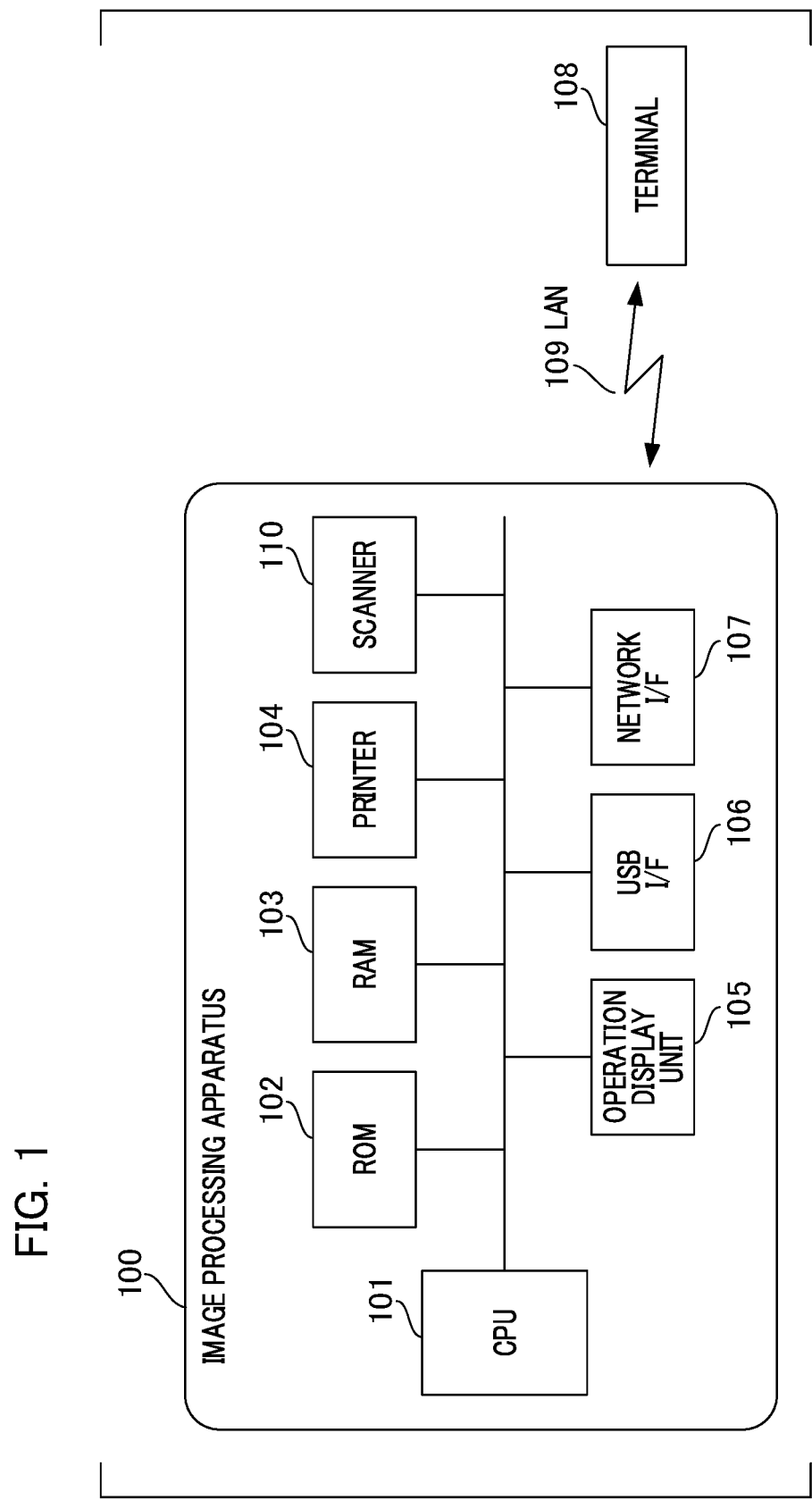

FIG. 6

| Owner user ID | Record ID | Record name | Application type | Update date and time | Application data | Number of calls | Record point |
|---|---|---|---|---|---|---|---|
| User0001 | 1 | Black and white A4 125% | Copy | 2017/10/24 08:51:22 | Color mode/Black and white<br>Paper size/A4<br>N-in-one printing/1 in 1<br>Magnification/125%<br>Number of copies/5<br>Print side/2-sided to 2-sided | 4 | 5 |
| User0001 | 2 | /folder/abc/<br>minutes.pdf | Use of stored file | 2017/10/22 09:04:43 | Folder path/"/folder/abc"<br>File name/"minutes.pdf"<br>Color mode/full color<br>Paper size/A4<br>Magnification/100%<br>Print side/2-sided | 0 | -1 |
| User0001 | 3 | /folder/abc/<br>estimateform.pdf | Use of stored file | 2017/10/21 12:23:05 | Folder path/"/folder/abc"<br>File name/"estimate form.pdf"<br>Color mode/black and white<br>Paper size/A3<br>Magnification/100%<br>Print side/1-sided | 20 | 18 |
| User0001 | 4 | Black and white B5 2in1 | Copy | 2017/10/23 15:29:50 | Color mode/black and white<br>Paper size/B5<br>N-in-one printing/2 in 1<br>Magnification/auto<br>Number of copies/1<br>Print side/1-sided to 2-sided | 2 | 2 |
| User0001 | 5 | Full color A4 100% | Copy | 2017/10/23 16:46:58 | Color mode/full color<br>Paper size/A4<br>N-in-one printing/1 in 1<br>Magnification/100%<br>Number of copies/10<br>Print side/2-sided | 3 | 3 |
| User0001 | 6 | /folder/abc/<br>manual.pdf | Use of stored file | 2017/10/21 12:23:05 | Folder path/"/folder/abc"<br>File name/"manual.pdf"<br>Color mode/full color<br>Paper size/A4<br>Magnification/100%<br>Print side/2-sided | 10 | 9 |

FIG. 12

| Record ID | File format | Date and time of registration | Application data |
|---|---|---|---|
| 1 | PDF | 2016/10/24 08:51:22 | Color mode／full color<br>Paper size／A4<br>N-in-one printing／1 in 1<br>Magnification／100%<br>Print side／1-sided |
| 2 | JPEG | 2016/10/23 10:55:13 | Color mode／full color<br>Paper size／A4<br>Magnification／100%<br>Print side／2-sided |
| 3 | PNG | 2016/10/21 12:23:05 | Color mode／black-and-white<br>Paper size／A3<br>Magnification／100%<br>Print side／1-sided |

FIG. 16

| Record ID 1301 | Record name 1302 | Producing method 1303 | Job type 1304 | Application data 1305 |
|---|---|---|---|---|
| 1 | Frequently used setting 0 | New | Copy | Color mode/full color<br>Paper size/A4<br>N-in-one printing/1 in 1<br>Magnification/100%<br>Print side/1-sided |
| 2 | Frequently used setting 1 | Timeline diversion | Use of stored file | Folder path/"/folder/abc"<br>File name/"minutes.pdf"<br>Color mode/full color<br>Paper size/A4<br>Magnification/100%<br>Print side/2-sided |
| 3 | Frequently used setting 2 | New | Fax | Paper size/A3<br>Destination of transmission/<br>xxx-xxx-xxx |

1300

IMAGE PROCESSING APPARATUS, CONTROL METHOD OF IMAGE PROCESSING APPARATUS, AND RECORDING MEDIUM

BACKGROUND OF THE INVENTION

Field of the Invention

The present invention relates to an image processing apparatus, a control method of the image processing apparatus, and a recording medium.

Description of the Related Art

Some image processing apparatuses have a function of storing a plurality of settings that have been performed for an executed job such as copying and scanning (hereinafter, referred to as a "timeline") to serve as a setting history (see Japanese Unexamined Patent Application, First Publication No. 2010-201931 and Japanese Unexamined Patent Application, First Publication No. 2015-146503). Additionally, there is also a method for simplifying the setting by using a method for permanently performing the setting to certain document data (hereinafter, referred to as a "document attribute"). When a specific document is selected from a document data selection screen, a predetermined setting is displayed, and a user can execute a job simply by providing an instruction to execute the job. These functions allow the user to call a desired setting without performing a detailed setting during job execution.

Comprehensive setting means such as a timeline and a document attribute can simplify a job execution procedure for the user. However, at the same time, it is difficult to understand setting contents to be reflected because various comprehensive setting methods are mixed. For example, if it is desired to execute a job for a PDF (Portable Document Format) file, the user presses a button in a timeline region. In contrast, since a setting that is suitable for PDF is associated with PDF by the document attribute, it is uncertain whether the setting of the document attribute is to be reflected if the setting history including the PDF document is selected from the timeline. As described above, during job execution, it is difficult to know in advance which comprehensive setting is to be performed by using which setting means.

SUMMARY OF THE INVENTION

The present invention provides an image processing apparatus in which a user can know in advance which comprehensive setting is to be executed during the printing of a document.

A image processing apparatus according to the present invention is an image processing apparatus that contains a plurality of services for utilizing a function of the image processing apparatus comprising: a display unit that displays an operation screen for a user's operation-input on a display unit in order to activate a predetermined service from among the services; a first activation unit that reads out a print setting in which history information during use of the predetermined service by the user is stored and displays the print setting on the display unit in a case where a first region of the operation screen has been selected; and a second activation unit that reads out a print setting stored in advance in association with a specific document attribute and displays the print setting on the display unit in a case in which a second region of the operation screen has been selected.

Further features of the present invention will become apparent from the following description of exemplary embodiments with reference to the attached drawings.

BRIEF DESCRIPTION OF THE DRAWINGS

FIG. 1 is a block diagram of an image processing apparatus.

FIG. 6 illustrates record information held by a timeline.

FIG. 12 illustrates record information held by a document attribute.

FIG. 16 illustrates record information held by the frequently used setting.

DESCRIPTION OF THE EMBODIMENTS

Figure 2A:
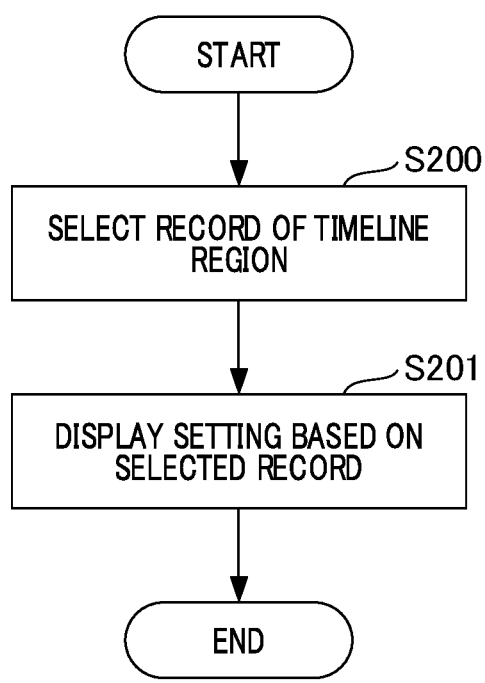
FIGS. 2A and 2B are flowcharts illustrating a control method during comprehensive setting display according to the first embodiment.

A stored setting history is displayed as a soft key on a region referred to as a "timeline region". Each history is expressed as a soft key that is touched by a user, and a history corresponding to the corresponding soft key is read by pressing the soft key. Subsequently, a setting screen provided by a target service in which comprehensive setting has been automatically performed is displayed. The timeline region is located adjacent to a service region on which an icon for selecting a service is displayed. The reason for simultaneously displaying the timeline region and the service selection region on an operation unit is that both are soft keys that can serve as a trigger that activates a service, and it is very convenient for the user to be able to activate the service from both regions. Hereinafter, the best mode for carrying out the present invention will be described by using the drawings.

First Embodiment

<Image Processing Apparatus>

FIG. 1 illustrates a configuration of an image processing apparatus according to the present embodiment. An image processing apparatus 100 has a CPU (central processing unit) 101 and a ROM (read only memory) 102. Additionally, the image processing apparatus 100 has a RAM 103 (Random Access Memory), a printer 104, an operation display unit 105, and a scanner 110. Further, the image processing apparatus 100 has a USB (Universal Serial Bus) I/F 106 and a network I/F 107 to serve as communication interfaces with the outside.

The CPU 101 is a system control unit and controls the entire image processing apparatus 100. The ROM 102 stores a control program of the CPU 101. Note that the above control program is a control program that executes the above embodiment to be described below. Additionally, the types of ROM 102 include a rewritable flash ROM and the like, and stores, for example, setting values and management data that have been registered by the user of the image processing apparatus 100.

The RAM 103 stores, for example, an execution program, program control variables, various work buffers, a part of the setting values and management data registered by the user of the image processing apparatus 100. The printer 104 is a hardware mechanism for forming an image on a sheet such as paper. The printer 104 forms an image on a sheet, for example, by feeding a sheet, charging a drum, irradiating a laser, forming an electrostatic latent image, and transferring and fixing an image onto a sheet.

The scanner 110 is a hardware mechanism that reads an original and captures image information that has been read into the ROM 102 or the RAM 103. There is a utilization method of the scanner 110 in which the captured image information is processed by a program or the like and is transmitted to the outside through a LAN 109. The operation display unit 105 is configured, for example, by a keyboard, a touch panel, an LCD, and an LED, receives various operations by the user, displays an operation screen, and provides a notification to the user.

The USB I/F 106 performs, for example, connection with a terminal 108, communication, and supply of electric power. The network I/F 107 transmits and receives data to and from each unit of the image processing apparatus 100 via the LAN 109. In particular, the network I/F 107 receives a print job from the terminal 108 and receives the control information for the image processing apparatus 100. Note that the LAN 109 includes communication by wire (wired LAN) and wireless communication (wireless LAN).

Figure 5:
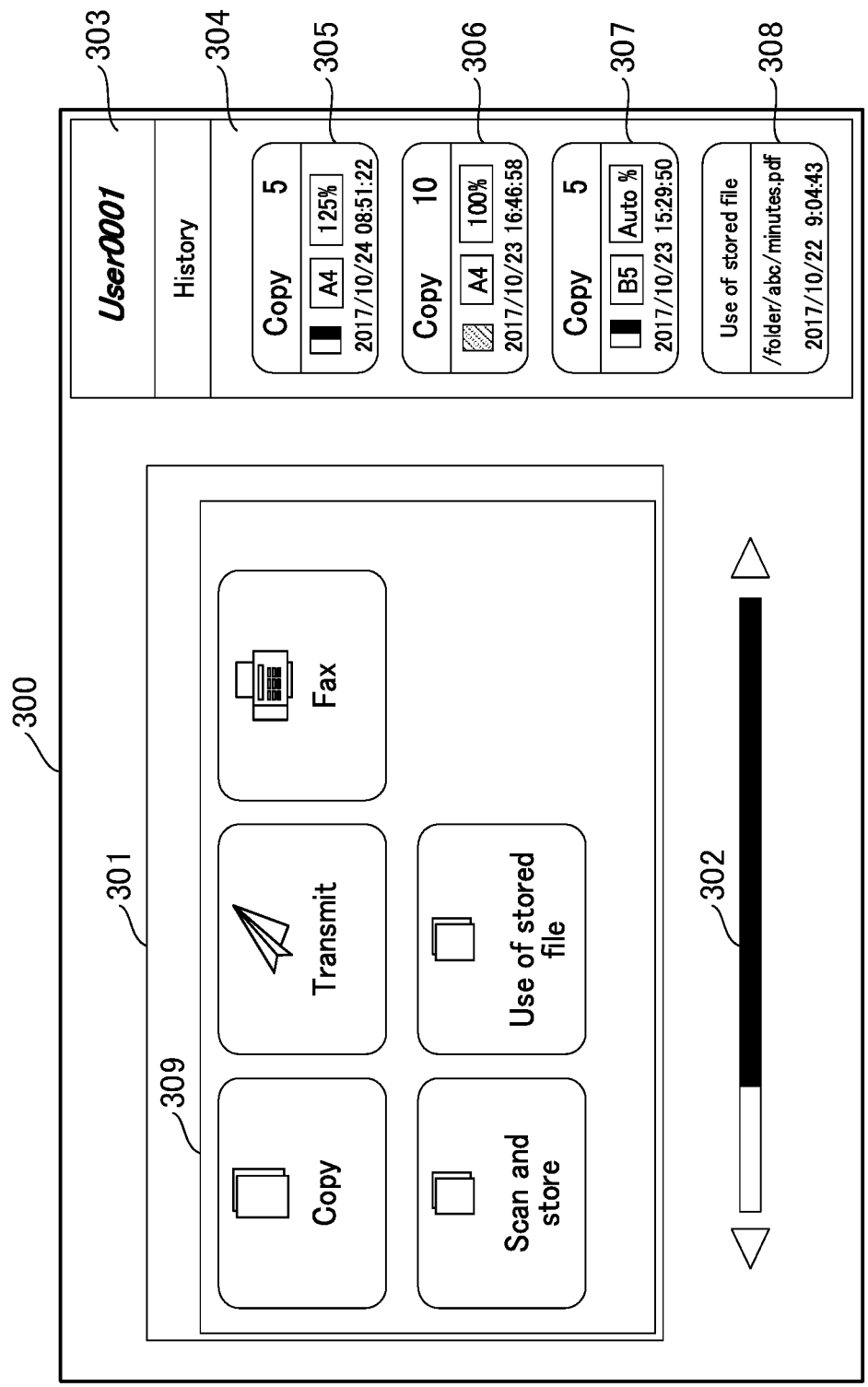
FIG. 5 illustrates an operation screen.

FIG. 5 illustrates a screen displayed on the operation display unit 105, which is referred to as a "home screen (operation screen)". The home screen is displayed by the CPU 101 executing the control program of the image processing apparatus 100. A home screen 300 is a screen for invoking the screen for each application. The user performs operation input to the home screen 300 to select a predetermined service. The home screen 300 includes a menu 301, a slide bar 302, a user name display region 303, and a timeline (first region) 304.

The menu 301 has a button region that displays an application button group 309, which are soft keys. The application button group (second region) 309 is a button group for transitioning to a screen of the corresponding application, and when any button is pressed, a screen provided by the program of the application corresponding to the pressed button is displayed. Additionally, in the present embodiment, the menu 301 is configured by a screen having one or more pages. The number of buttons displayed on one page is determined by button layout settings (not illustrated) stored in the ROM 102 or the RAM 103. Note that in the present embodiment, although a soft key is used, the present invention is not limited thereto. For example, another method may be used as long as the screen can transition to an application screen.

The slide bar 302 is a button for switching the pages of the menu 301. Note that, in a touch panel, the pages of the menu 301 may be switched by a flick operation or by a press of a hard key. The user name display region 303 is a display region that displays the name of a user that is currently logged-in. The timeline 304 is a region that displays a history (record) of the settings associated with a job. Records 305 to 308 represent records. Here, a detailed description will be given by taking an example of the record 305. The record 305 indicates that a copy job having color mode "black and white", paper size "A4", size magnification "125%", the number of copies "5 copies", was performed on "2017/10/24 08:51:22". It is possible to reuse the settings of the copy job at that time as a history.

Next, a case in which the record 305 is pressed will be described. The record 305 is stored in the ROM 102 or the RAM 103 for each login user in a manner associated with record information (history information) 400 shown in FIG. 6 (to be described below). FIG. 6 is an explanatory diagram that explains the record information stored in the ROM 102 or the RAM 103. In the present embodiment, a description will be given by using an example of the record information that is invoked from the ROM 102 or the RAM 103 in a case where a user having a login user ID "User0001" is logged in. The record information 400 is configured by an owner user ID 401, a record ID 402, a record name 403, an application type 404, an update date and time 405, application data 406, the number of calls 407, and a record point 408. These are examples of the record information 400 and the record information 400 may hold other items. Additionally, an item to be held may be different depending on application.

The owner user ID 401 indicates a user ID for identifying a user that has executed a job. With this information, the record information of the owner user ID that matches the login user ID is invoked. The record ID 402 indicates IDs for uniquely identifying records. The record name 403 indicates the display name of the record. The application type 404 indicates an identifier of the application. The update date and time 405 indicates the date and time when the record has been registered. The application data 406 indicates arbitrary setting data.

The example of the record information 400 shown in FIG. 6 is described in the hash map format "KEY/VALUE". In the case of explaining the record ID 402 being "1" as an example, the setting data that has a color mode "black and white", a paper size "A4", N-in-one printing "1 in 1", a size magnification "125%", the number of copies "5 copies", and print side "2-sided from 2-sided" is obtained. The number of calls 407 represents the number of times a record has been reused. The record ID 402 being "1" indicates that the record has been reused four times, and the record ID 402 being "3" indicates that the record has been reused twenty times. The record point 408 is a point of each record calculated based on the update date and time 405 and the number of calls 407. When a new job is executed, the application type and application data of the new job is compared with the application type and application data associated with all the records stored in the record information 400. If the application type and application data of the new job match the application type and application data associated with all the records stored in the record information 400, the update date and time of the matched record is overwritten with the current time. Additionally, if a new record is added by the execution of a new job, the storage number sometimes exceeds the maximum storage number of the records that has been determined by the program. In that case, the record having the oldest update date and time is deleted from the ROM 102 or the RAM 103, and a new record by the new job is added.

Figure 10:
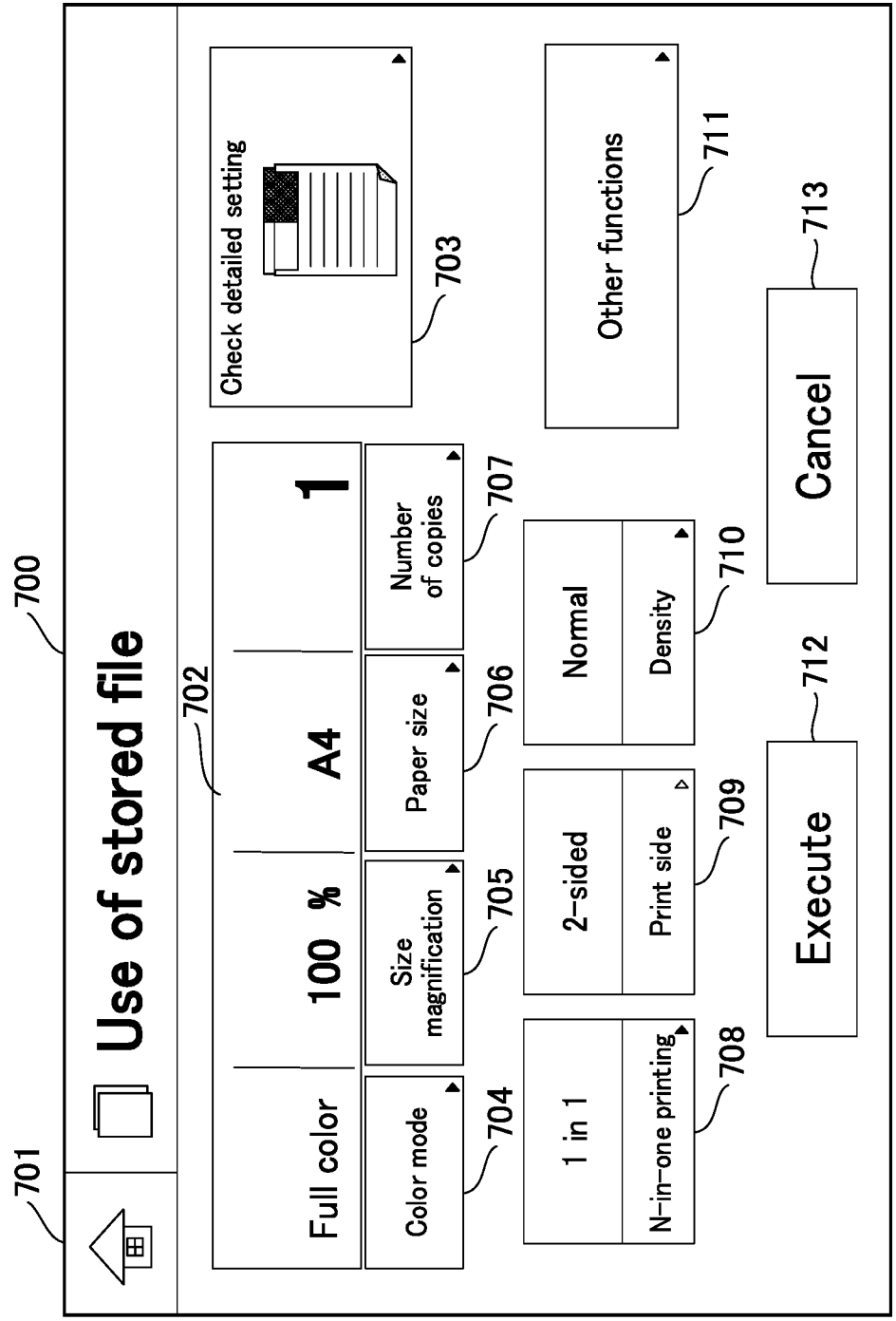
FIG. 10 illustrates a setting confirmation screen during use of a timeline.

FIG. 10 illustrates a setting confirmation screen (first print setting) 700 displayed upon the pressing of the record 308 associated with the record having the record ID 402 "2". A home button 701 is a button that returns to the home screen when pressed. A setting value display region 702 is a region that displays each setting value of a color mode, a size magnification, a sheet size, and number of copies. A detail setting confirmation button 703 is a button that represents the current setting in a preview, and when the button is pressed, a detail setting confirmation screen (not illustrated) is displayed. Setting selection buttons 704 to 707 are buttons for respectively setting a color mode, a size magnification, a sheet size, and the number of copies. At the top of each of setting display/selection buttons 708 to 710, each setting value of N-in-one printing, print side, and a density is displayed, and at the bottom thereof, buttons for performing each setting are displayed. The other function button 711 is a button for displaying a screen (not illustrated) that performs the other settings (for example, the setting of a stapler). An execution button 712 is a button that starts the execution of a job when pressed. A cancel button 713 is a button that closes the setting confirmation screen 700 when pressed.

Figure 11:
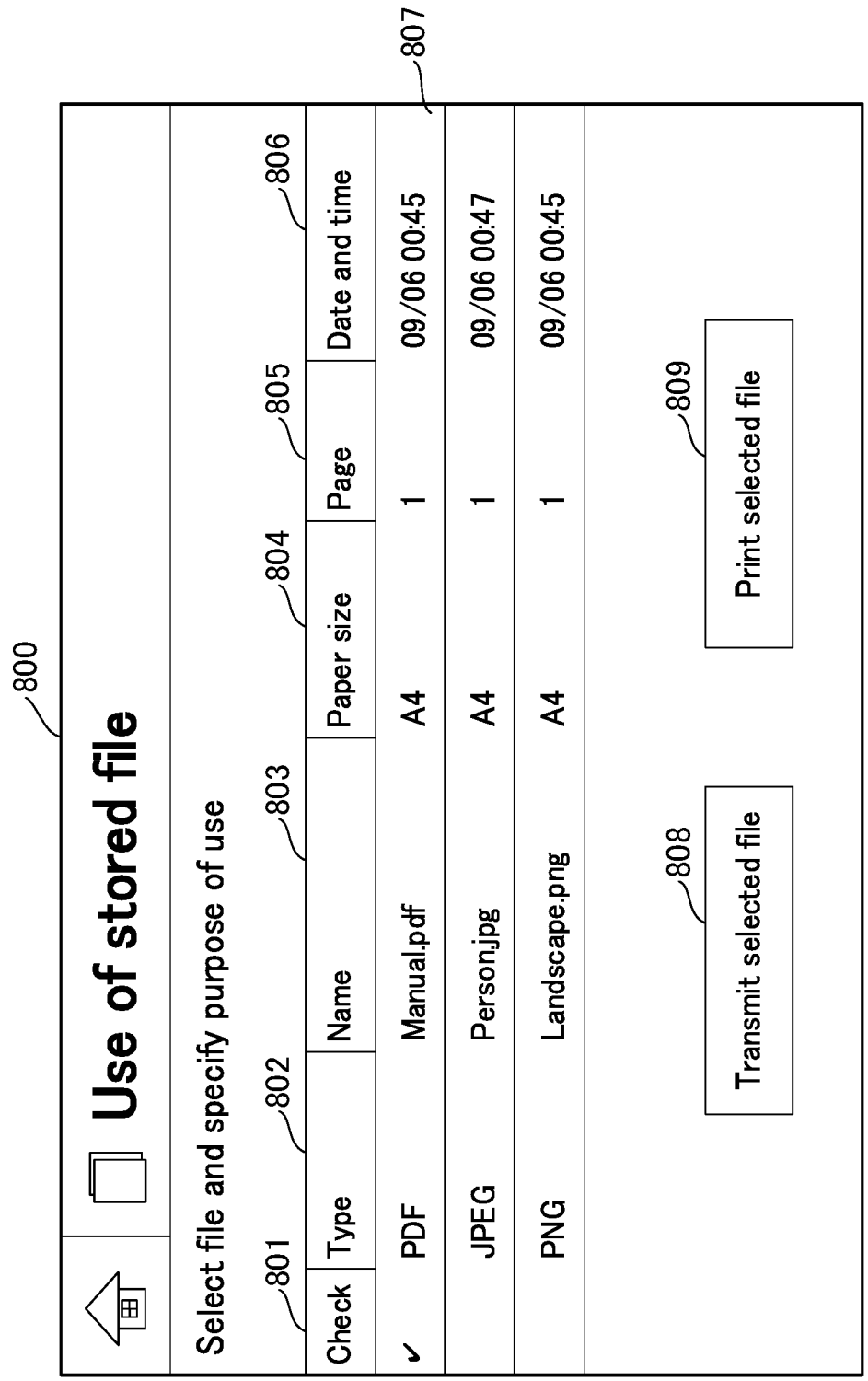
FIG. 11 illustrates a document selection screen.

FIG. 11 illustrates a document selection screen 800 displayed when a "use of stored file" button located in the application button group 309 is pressed. FIG. 11 shows that a record 807 is configured by check 801, type 802, name 803, paper size 804, page 805, and date and time 806. If the record 807 is selected, a mark indicating that the selection region (check 801) of the record 807 has been selected is displayed (a check mark at the left end of the record 807 in FIG. 11). A transmission button 808 is pressed if the selected file is transmitted by using the transmission application. A print button 809 is pressed if printing processing is performed on the selected file by using a print application.

FIG. 12 illustrates record information 900 of the document attribute according to the present embodiment. Record ID 901 indicates an ID for uniquely identifying records. File format 902 indicates the selected file format. Registration date and time 903 indicates the date and time when the document attribute setting was registered. Application data 904 indicates arbitrary setting data.

Figure 13:
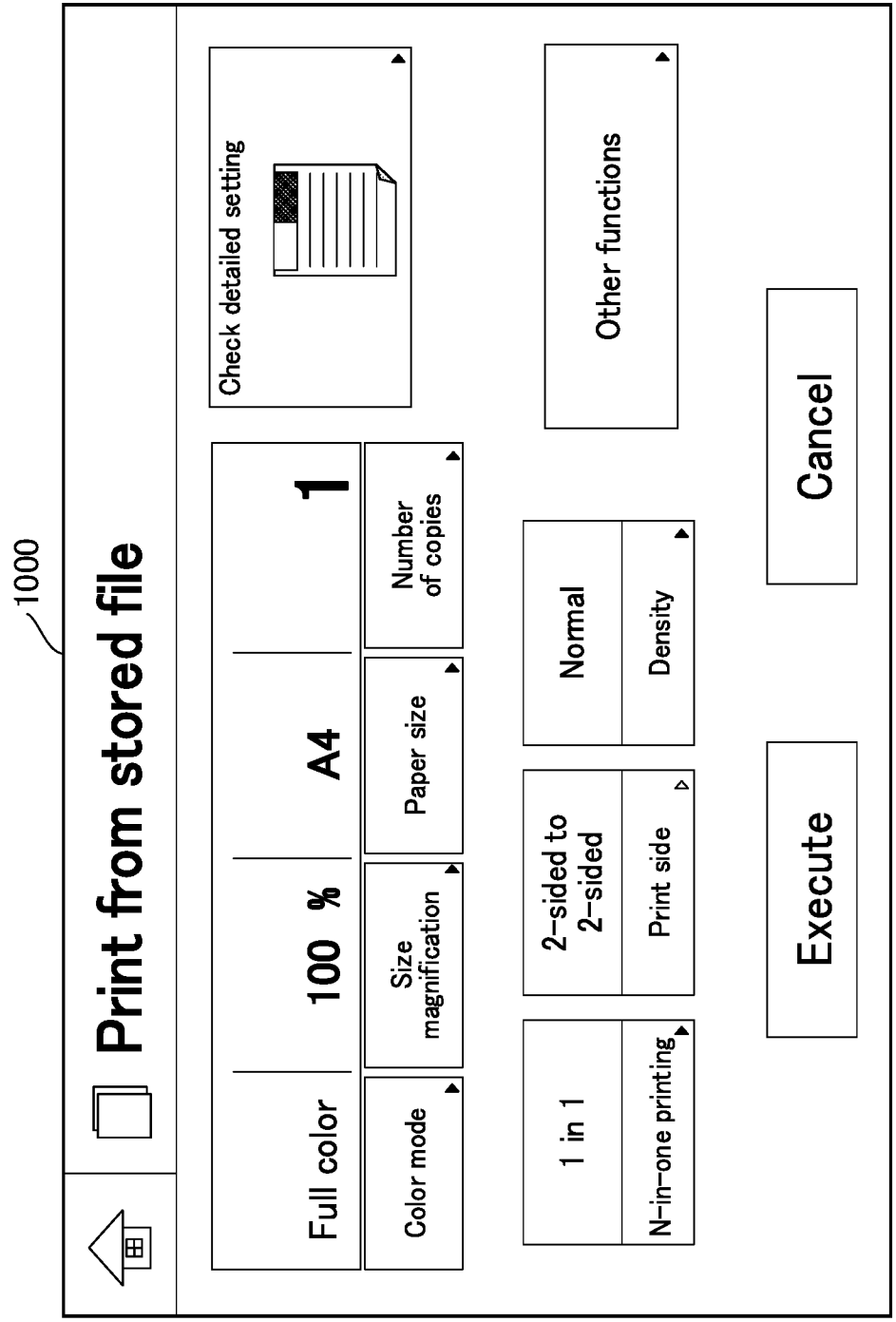
FIG. 13 illustrates a setting confirmation screen during use of a store file.

FIG. 13 illustrates a setting confirmation screen (second print setting) 1000 that is displayed when the print button 809 is pressed in a state in which the file selection region 807 is being selected. Since the selected file format (document attribute) is "PDF", each setting is displayed based on the application data 904 associated with the file format 902.

Figure 2B:
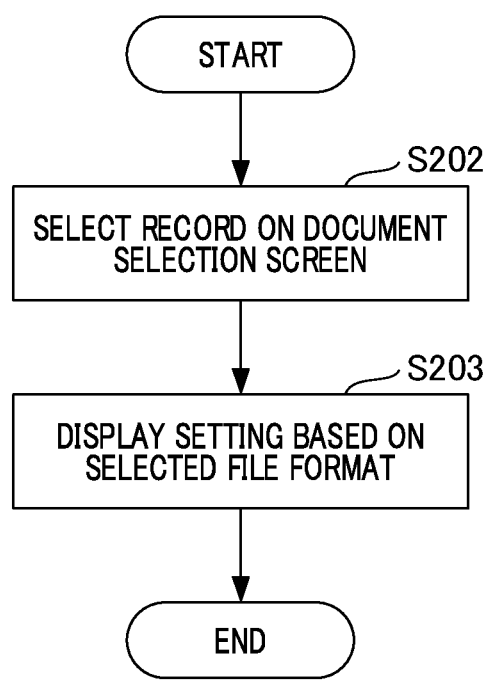

Next, FIGS. 2A and 2B are flowcharts illustrating a control method related to the setting display method according to the present embodiment. The processes shown in FIGS. 2A and 2B are realized by executing, for example, a display control program (hereinafter, simply referred to as a "program") read out from the ROM 102 or the like by the CPU 101. The following flow is described as the program executes each step that is the object. Note that the image processing apparatus 100 according to the present embodiment has a timeline and a document attribute as a comprehensive setting execution method.

First, if the record 308 is selected by the user (step S200), the application data 406 associated with the record 308 is displayed on the LCD of the operation display unit 105 (step S201, the setting confirmation screen 700). In contrast, if the record 807 is selected by the user (step S202), the application data 904 associated with the record 807 is displayed on the LCD of the operation display unit 105 (step S203, the setting confirmation screen 1000).

As described above, according to the present embodiment, it is possible to provide an image processing apparatus in which a user can know in advance which comprehensive setting is to be executed upon the printing of a document. Consequently, the user can easily recognize the contents to be comprehensively set with a smaller amount of procedures because the setting is determined by the calling procedure in the comprehensive setting execution method.

Second Embodiment

In the first embodiment, although the setting content is determined by the setting calling procedure by the user, if the settings conflict, a method for notifying about a conflicting item and the setting values thereof may be used. Note that the conflict in the present embodiment means a case in which different setting values are set for the same setting item. For example, setting values of "1-sided" and "2-sided" exist in the setting item "print side". For example, while the record 308 has the setting information of "PDF document" and "2-sided", "PDF document" and "1-sided" (see FIG. 12) are associated in the document attribute, thereby causing a contradiction between the settings, in other words, causing a conflict. Therefore, in the description of the present embodiment, a description will be given based on the above example.

Figure 3:
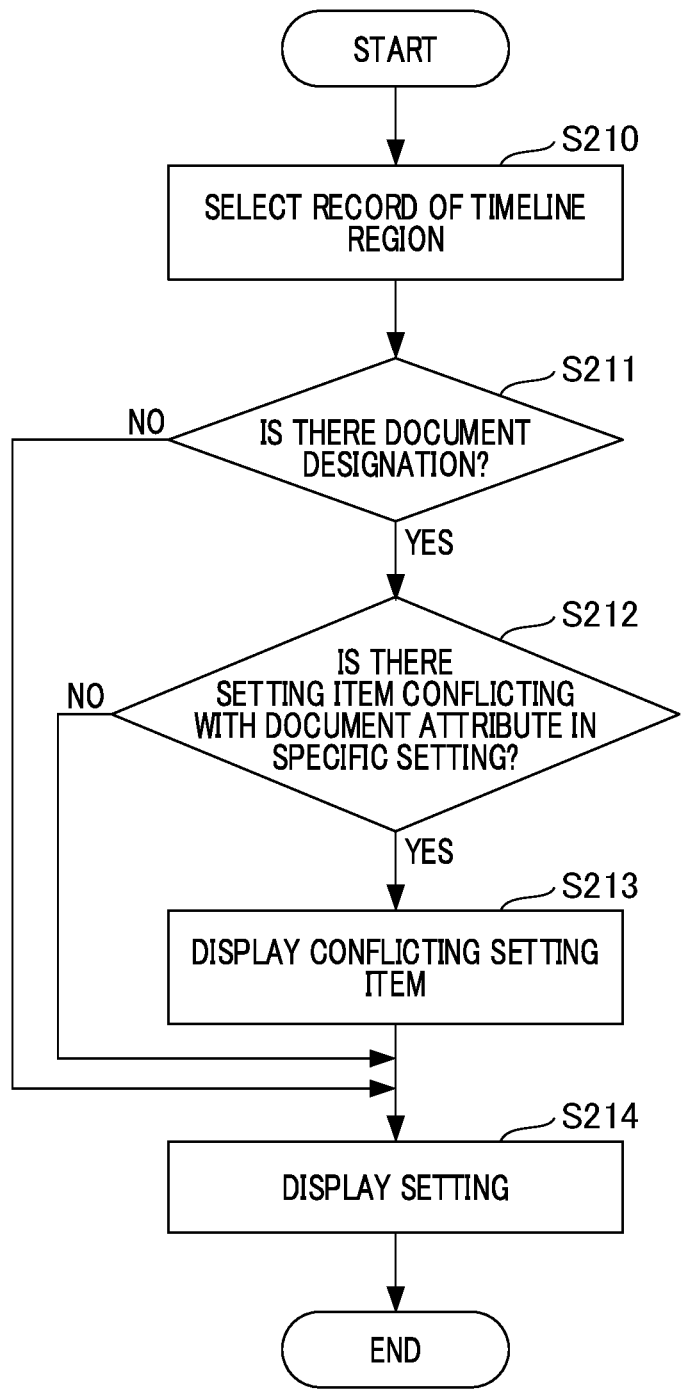
FIG. 3 is a flowchart illustrating a control method during comprehensive setting display according to the second embodiment.
Figure 7:
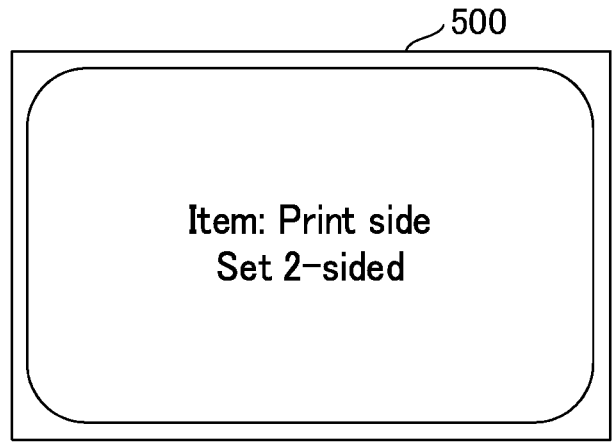
FIG. 7 illustrates a notification screen during setting conflicts according to the second embodiment.

FIG. 3 is a flowchart illustrating a control method related to the setting display method according to the present embodiment. The process shown in FIG. 3 is realized, for example, by executing a program. First, when the record 308 is selected by the user (step S210), it is determined whether or not there is a document designation in the application data 406 that is associated with the record 308 (step S211). If there is a document designation ("Yes" in step S211), it is determined whether or not there is a conflicting item in a specified setting from the setting (FIG. 12) in which the designated document is associated by the document attribute (step S212). If a conflicting item exists ("Yes" in step S212), the conflicting item and a setting value that is set in the item are displayed as in a setting notification screen 500 (step S213, the setting notification screen 500). Next, the application data 406 associated with the record 308 is displayed on the LCD of the operation display unit 105 (step S214, the setting confirmation screen 700). If the notification content of the setting notification screen 500 shown in FIG. 7 is different from the user's intention, the user can change the setting by operating the setting confirmation screen 700. In contrast, if there is no document designation ("No" in step S211), and if there are no conflicting settings ("No" in step S212), the process proceeds to step S214. Subsequently, the application data 406 associated with the record 308 is displayed on the LCD of the operation display unit 105 (step S214, the setting confirmation screen 700).

As described above, according to the present embodiment, the user can recognize that the setting using the timeline conflicts with the setting using the document attribute by displaying the setting notification screen 500, and an unintended job execution can be suppressed.

Third Embodiment

In the second embodiment, although a method for notifying about conflict items and their setting values is used, a method for having the user decide which set value to be adopted may be used. Note that in the present embodiment, although the case in which the user sets "2-sided" for the item of print side will be described, the present invention is not limited thereto, and another item and the setting value thereof may be adopted.

Figure 4:
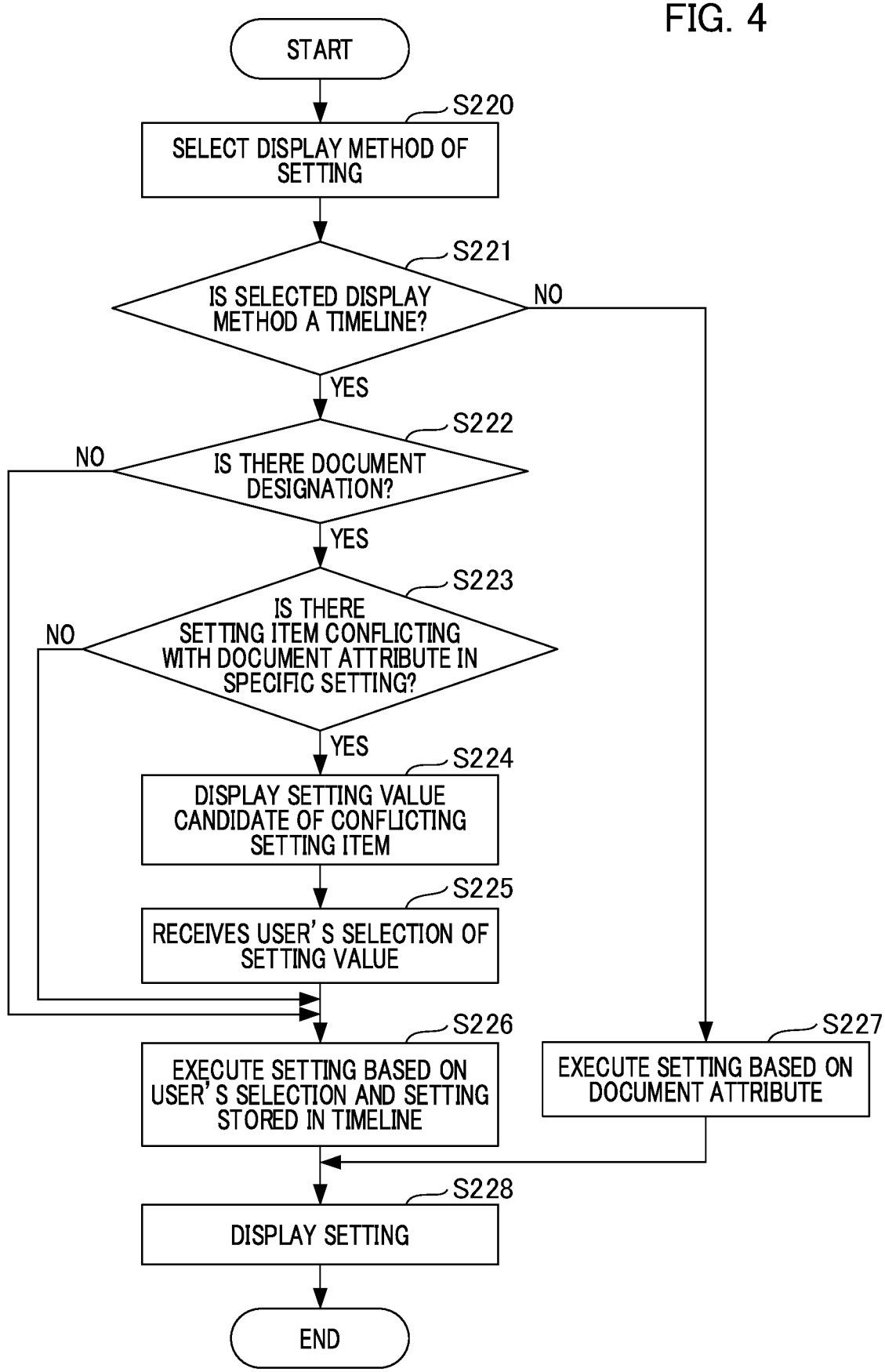
FIG. 4 is a flowchart illustrating a control method during comprehensive setting display according to the third embodiment.

FIG. 4 is a flowchart that illustrates a control method related to the setting display method according to the present embodiment. The process shown in FIG. 4 is realized, for example, by executing a program. First, if a record region is selected by the user (step S220), it is determined whether or not the record 308 has been selected (step S221). If the record 308 has been selected ("Yes" in step S221), it is determined whether or not there is a document designation in the application data 406 associated with the record 308 (step S222). In contrast, if the record 308 has not been selected (the record 807 has been selected) ("No" in step S221), the application data 904 associated with the record 807 is executed (step S227). Subsequently, the setting is displayed on the LCD of the operation display unit 105 (step S228, the setting confirmation screen 1000).

Next, if there is a document designation ("Yes" in step S222), it is determined whether or not there is a conflicting item in a specific setting from the setting in which the designated document is associated by the document attribute (FIG. 12) (step S223). If a conflicting item exists ("Yes" in step S223), the conflicting item and all of the candidate values of the setting value set in the item are displayed (step S224, a setting selection screen 510). In the setting selection screen 510 shown in FIG. 8, selecting "2-sided" region by a screen operation of the user is accepted (step S225), and the application data 406 associated with the record 308 is executed (step S226). Subsequently, the setting is displayed on the LCD of the operation display unit 105 (step S228, the setting confirmation screen 700). In contrast, if there is neither a document designation ("No" in step S212) nor conflicting settings ("No" in step S223), the application data 406 associated with the record 308 is executed (step S226). Subsequently, the setting is displayed on the LCD of the operation display unit 105 (step S228, the setting confirmation screen 700).

As described above, according to the present embodiment, it is possible to set a conflicting item before the screen transitions to the setting confirmation screen 700 by displaying the setting selection screen 510, so that setting can be performed with an easier procedure than the second embodiment.

Fourth Embodiment

Although the control method during comprehensive setting by using a timeline and a document attribute has been described in the first to third embodiments, it is also contemplated that another comprehensive setting method is used. For example, there is a function of registering and calling the contents manually set by the user as a comprehensive setting (hereinafter, referred to as a "frequently used setting"). As a method for registering the frequently used setting, there is a method for manually registering items one by one, and as a method for realizing easier registration, there is a method for registering (diverting) the setting of a timeline without any changes to serve as a frequently used setting.

Figure 14:
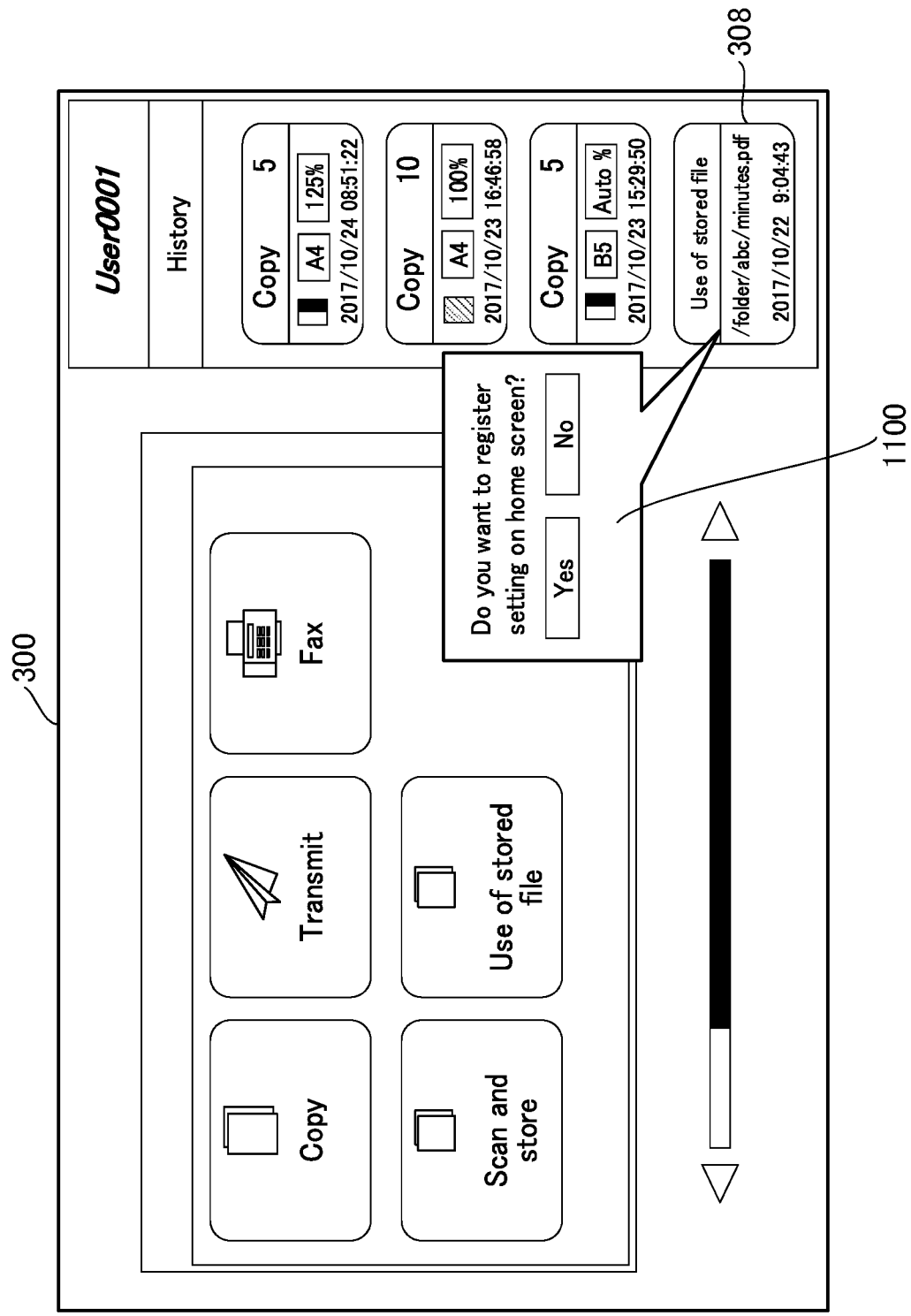
FIG. 14 illustrates a registration screen of a frequently used setting.
Figure 15:
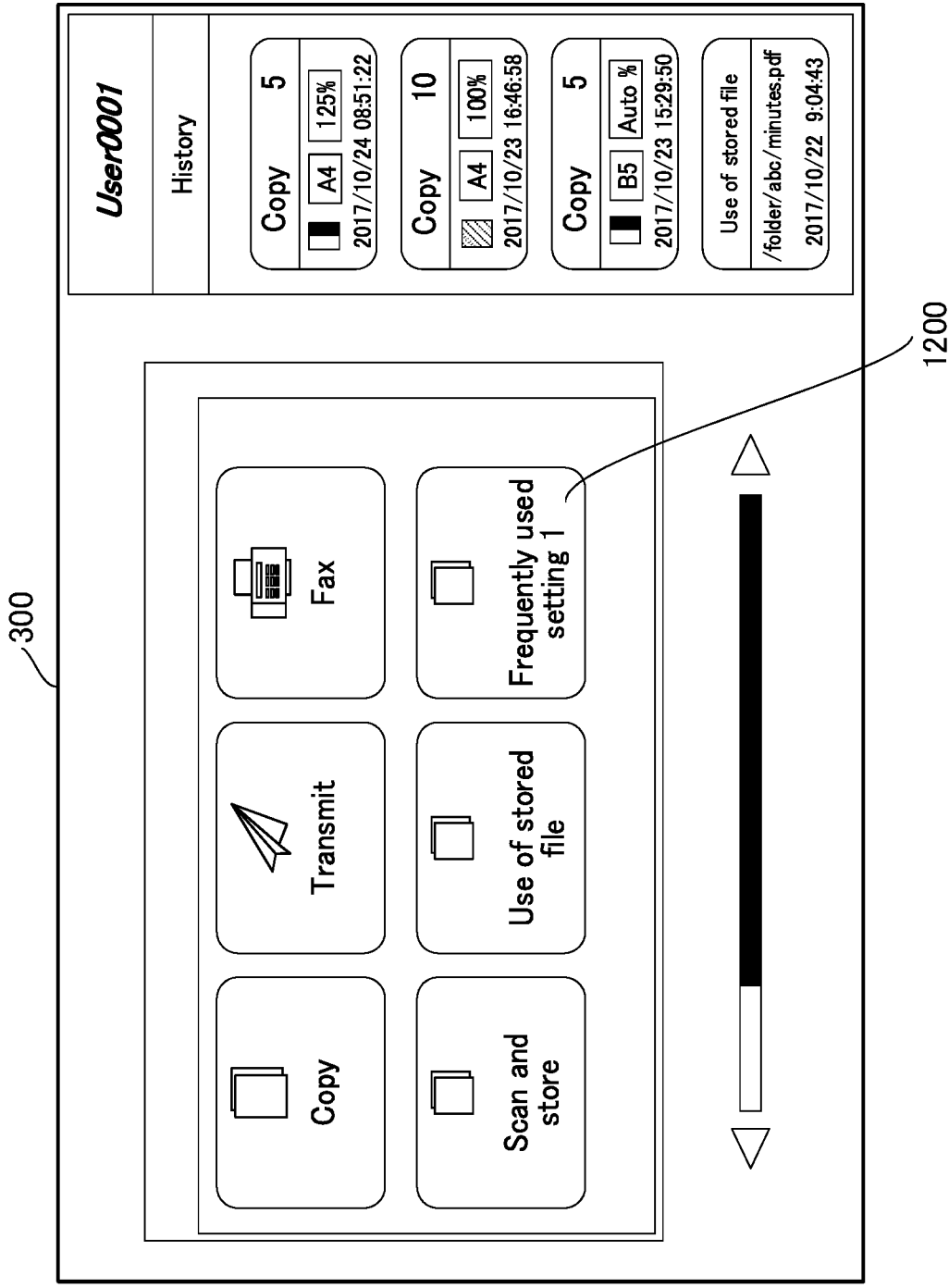
FIG. 15 illustrates a screen after the frequently used setting is registered.

FIGS. 14 and 15 illustrate the registration method of the record 308 located in the timeline region as a frequently used setting. For example, when long pressing of the record 308 is detected, a home registration screen 1100 is displayed.

Next, if "Yes" in the home registration screen 1100 has been selected, a frequently used setting icon 1200 is generated.

FIG. 16 illustrates record information 1300 of the frequently used setting according to the present embodiment. Each record has attributes of record ID 1301, record name 1302, generation method 1303, job type 1304, and application data 1305. The frequently used setting icon 1200 is associated with the record having the record name 1302 "commonly used setting 1". If the frequently used setting icon 1200 is selected, the information about the generation method 1303 is referred to, and the processes of the first to third embodiments are executed similarly when the record 308 has been selected.

As described above, according to the present embodiment, even if the comprehensive setting method other than the timeline is used (if the frequently used setting is used), the setting is determined by the call procedure of the comprehensive setting execution method, the user can easily recognize the contents to be comprehensively set with a smaller number of procedures.

Fifth Embodiment

Figure 8:
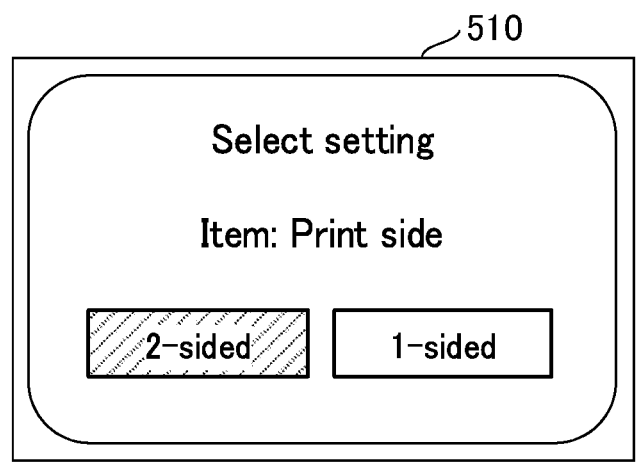
FIG. 8 illustrates a selection screen during setting conflicts according to the third embodiment.
Figure 9:
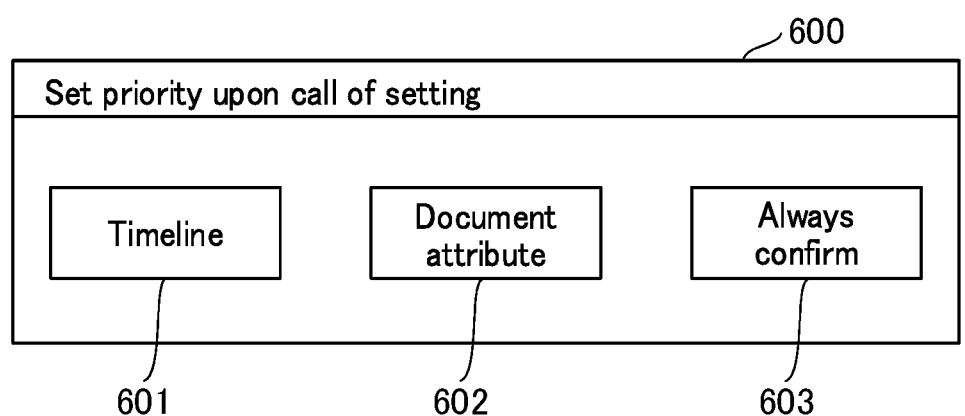
FIG. 9 illustrates a setting screen that determines a setting means to be prioritized during setting conflicts.

In the present embodiment, a description will be given of a case in which a setting value that determines what setting method is to be prioritized by the user's intention is provided in advance. FIG. 9 is a setting screen that determines the priority of each setting method. The user registers in advance a setting method to be prioritized during conflict on this screen. The operation of the conflicting item during comprehensive setting is determined based on this setting. If an option 601 in a setting screen 600 has been set, the setting of the timeline has a priority. If an option 602 has been set, the setting of the document attribute has a priority. If an option 603 has been set, the setting notification screen 500 shown in FIG. 7 or the setting selection screen 510 shown in FIG. 8 is displayed.

As described above, according to the present embodiment, it is possible to select not to display the notification screen or the confirmation screen for each job by setting a priority item in advance, and the user can execute the job more easily.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-163035, filed Aug. 31 2018, which is hereby incorporated by reference herein in its entirety.

What is claimed is:

1. An image processing apparatus having a plurality of functions comprising:
    a memory storing instructions; and
    at least one processor executing the instructions causing the image processing apparatus to:
    display an operation screen which includes a plurality of buttons for executing the plurality of functions;
    display a selection screen for selecting a document, in a case in which a first button is selected from the operation screen;
    receive a selection of processing for a first document which is selected on the selection screen, wherein selectable processing includes at least a first processing and a second processing;
    display, in a case in which a selection of the first processing is received, a setting screen for accepting a setting for the first processing for the first document;
    perform the first processing based on a first setting accepted by the setting screen;
    store information including at least information indicating the first setting and information indicating the first document as history information;
    display a second button corresponding to the history information on the operation screen which includes the plurality of buttons for executing the plurality of functions; and
    read out the first setting and the first document and display the setting screen for the first processing in which the first setting performing the first processing to the first document is reflected, in a case the second button is selected.

2. A control method for an image processing apparatus having a plurality of functions and displaying an operation screen which includes a plurality of buttons for executing the plurality of functions, the control method comprising:
    displaying a selection screen for selecting a document, in a case in which a first button is selected from the operation screen;
    receiving a selection of processing for a first document which is selected on the selection screen, wherein selectable processing includes at least a first processing and a second processing;
    displaying, in a case in which a selection of the first processing is received, a setting screen for accepting a setting for the first processing for the first document;
    performing the first processing based on a first setting accepted by the setting screen;
    storing information including at least information indicating the first setting and information indicating the first document as history information;
    displaying a second button corresponding to the history information on the operation screen which includes the plurality of buttons for executing the plurality of functions; and
    reading out the first setting and the first document and displaying the setting screen for the first processing in which the first setting for performing the first processing to the first document is reflected, in a case the second button is selected.

3. A non-transitory recording medium storing a computer program of an image processing apparatus having a plurality of functions and displaying an operation screen which includes a plurality of buttons for executing the plurality of functions, and for causing a computer to perform each step of a control method of the computer, the control method comprising:
    displaying a selection screen for selecting a document, in a case in which a first button is selected from the operation screen;
    receiving a selection of processing for a first document which is selected on the selection screen, wherein selectable processing includes at least a first processing and a second processing;
    displaying, in a case in which a selection of the first processing is received, a setting screen for accepting a setting for the first processing for the first document;
    performing the first processing based on a first setting accepted by the setting screen;
    storing information including at least information indicating the first setting and information indicating the first document as history information;
    displaying a second button corresponding to the history information on the operation screen which includes the plurality of buttons for executing the plurality of functions; and
    reading out the first setting and the first document and displaying the setting screen for the first processing in which the first setting for performing the first processing to the first document is reflected, in a case the second button is selected.

4. The image processing apparatus according to claim 1, wherein the instructions further cause the image processing apparatus to:
    display a setting screen that reflects the read out first setting and the first document when the second button is selected.

5. The image processing apparatus according to claim 1, wherein the instructions further cause the image processing apparatus to:
    associate a setting for a document for each document attribute.

6. The image processing apparatus according to claim 5, wherein a setting screen corresponding to a setting associated with an attribute of the first document when displaying the setting screen is displayed.

7. The image processing apparatus according to claim 6, wherein the instructions further cause the image processing apparatus to:
    display different settings recognizable to a user if there is a difference between a setting associated with an attribute of the document indicated by the history information and the first setting indicated by the history information.

8. The image processing apparatus according to claim 6, wherein the instructions further cause the image processing apparatus to:
   control whether to prioritize reading out the associated setting or the first setting when the second button is selected if there is a difference between a setting associated with an attribute of the document indicated by the history information and the first setting indicated by the history information.

9. The image processing apparatus according to claim 8, wherein, when the control is performed, control to give priority to the first setting.

10. The image processing apparatus according to claim 8, wherein, when the control is performed, control whether to prioritize reading out the associated setting or the first setting according to the setting made by a user in advance.

11. The image processing apparatus according to claim 8, wherein, when the control is performed, control whether to prioritize reading out the associated setting or the first setting according to user's selection operation.

12. The image processing apparatus according to claim 5, wherein the document attribute is a file format.

13. The image processing apparatus according to claim 1, wherein the operation screen is a home screen.

14. The image processing apparatus according to claim 1, wherein a document displayed on the selected screen is a document stored in the image processing apparatus.

15. The image processing apparatus according to claim 1, wherein the instructions further cause the image processing apparatus to:
   display, in a case in which a selection of the second processing is received, a setting screen for accepting a setting for the second processing for the first document;
   perform the second processing based on a second setting accepted by the setting screen;
   store information including at least information indicating the second setting and information indicating the first document as history information;
   display a third button corresponding to the history information on the operation screen which includes a plurality of buttons for executing the plurality of functions; and
   read out the second setting and the first document, and display the setting screen for the second processing in which the second setting for performing the second processing to the first document is reflected, in a case the third button is selected.

16. The image processing apparatus according to claim 1, wherein the first processing and the second processing are either a printing processing or a data transmission processing.

* * * * *